(12) United States Patent
Signorelli et al.

(10) Patent No.: US 8,760,851 B2
(45) Date of Patent: Jun. 24, 2014

(54) ELECTROCHEMICAL DOUBLE-LAYER CAPACITOR FOR HIGH TEMPERATURE APPLICATIONS

(75) Inventors: Riccardo Signorelli, Cambridge, MA (US); Lindsay A. Wilhelmus, Cambridge, MA (US)

(73) Assignee: Fastcap Systems Corporation, Boston, MA (US)

( * ) Notice: Subject to any disclaimer, the term of this patent is extended or adjusted under 35 U.S.C. 154(b) by 285 days.

(21) Appl. No.: 12/928,896

(22) Filed: Dec. 21, 2010

(65) Prior Publication Data

US 2012/0154979 A1    Jun. 21, 2012

(51) Int. Cl.
*H01G 9/00* (2006.01)
*H01G 9/022* (2006.01)
*H01G 9/04* (2006.01)

(52) U.S. Cl.
CPC ............... *H01G 9/00* (2013.01); *H01G 9/155* (2013.01); *H01G 9/038* (2013.01); *H01G 9/058* (2013.01)
USPC ........... 361/502; 361/503; 361/504; 361/512; 361/517; 361/519

(58) Field of Classification Search
CPC ......... H01G 9/00; H01G 9/155; H01G 9/038; H01G 9/058; H01G 11/32; H01G 11/58
USPC ......... 361/502, 503–504, 509, 512, 516–519, 361/523–525, 528–529; 429/9, 15
See application file for complete search history.

(56) References Cited

U.S. PATENT DOCUMENTS

| | | | |
|---|---|---|---|
| 4,408,259 | A | 10/1983 | Muranaka et al. |
| 5,440,447 | A | 8/1995 | Shipman et al. |
| 5,711,988 | A | 1/1998 | Tsai et al. |
| 6,059,847 | A | 5/2000 | Farahmandi et al. |
| 6,193,779 | B1 | 2/2001 | Reichert et al. |
| 6,205,016 | B1 | 3/2001 | Niu |
| 6,232,706 | B1 | 5/2001 | Dai et al. |
| 6,304,427 | B1 | 10/2001 | Reed et al. |
| 6,388,423 | B1 | 5/2002 | Schilleci, Jr. |

(Continued)

FOREIGN PATENT DOCUMENTS

| | | |
|---|---|---|
| JP | 2003133185 A | 5/2003 |
| WO | WO966985 A | 12/1999 |
| WO | WO200816990 A2 | 2/2008 |

OTHER PUBLICATIONS

International Search Report from PCT/US2007/068314, mailed Feb. 13, 2008.

(Continued)

*Primary Examiner* — Nguyen T Ha
(74) *Attorney, Agent, or Firm* — Wolf, Greenfield & Sacks, P.C.

(57) ABSTRACT

Methods and apparatus for an electrochemical double-layer capacitor for hostile environments. An electrochemical double-layer capacitor includes two electrodes wetted with an electrolyte, each electrode being attached to or in contact with or coated onto a current collector and separated from each other by a separator porous to the electrolyte, the electrodes, electrolyte and current collector containing less than 1,000 parts per million (ppm) of impurities, while exhibiting a leakage current less than 1 amp per liter of volume over a range of operating temperatures and at a voltage up to a rated voltage.

25 Claims, 1 Drawing Sheet

(56) References Cited

U.S. PATENT DOCUMENTS

| | | | |
|---|---|---|---|
| 6,454,816 | B1 | 9/2002 | Lee et al. |
| 6,491,848 | B1 | 12/2002 | Sato et al. |
| 6,565,701 | B1 | 5/2003 | Jerabek et al. |
| 6,665,169 | B2 | 12/2003 | Tennent et al. |
| 6,906,911 | B2 | 6/2005 | Ikeda et al. |
| 7,126,207 | B2 | 10/2006 | Mosley et al. |
| 7,201,627 | B2 | 4/2007 | Ohnuma |
| 7,335,395 | B2 | 2/2008 | Ward et al. |
| 7,381,367 | B1 | 6/2008 | Baker et al. |
| 7,511,941 | B1 | 3/2009 | Gallay et al. |
| 7,699,102 | B2 | 4/2010 | Storm et al. |
| 7,785,558 | B2 | 8/2010 | Hikata |
| 7,982,439 | B2 | 7/2011 | Trainor et al. |
| 8,168,331 | B2 | 5/2012 | Best et al. |
| 2002/0177018 | A1 | 11/2002 | Fuglevand |
| 2003/0003359 | A1 | 1/2003 | Banno et al. |
| 2003/0030969 | A1 | 2/2003 | Farahmandi et al. |
| 2003/0081372 | A1 | 5/2003 | Nakazawa et al. |
| 2004/0131937 | A1 | 7/2004 | Chen et al. |
| 2004/0188350 | A1 | 9/2004 | Beste et al. |
| 2004/0229117 | A1 | 11/2004 | Mitani et al. |
| 2005/0152096 | A1 | 7/2005 | Farahmandi et al. |
| 2005/0208207 | A1 | 9/2005 | Hinoki et al. |
| 2005/0230270 | A1 | 10/2005 | Ren et al. |
| 2005/0231893 | A1 | 10/2005 | Harvey |
| 2005/0234177 | A1 | 10/2005 | Zaghib et al. |
| 2006/0019168 | A1 | 1/2006 | Li et al. |
| 2006/0194102 | A1 | 8/2006 | Keshishian et al. |
| 2006/0256506 | A1 | 11/2006 | Konuma et al. |
| 2006/0279906 | A1 | 12/2006 | Stemen et al. |
| 2007/0015336 | A1 | 1/2007 | Farahmandi et al. |
| 2007/0076349 | A1 | 4/2007 | Dementiev et al. |
| 2007/0097598 | A1 | 5/2007 | Siggel et al. |
| 2007/0146965 | A1 | 6/2007 | Mitchell et al. |
| 2007/0188977 | A1 | 8/2007 | Takeda et al. |
| 2007/0254213 | A1 | 11/2007 | Best et al. |
| 2007/0258192 | A1 | 11/2007 | Schindall et al. |
| 2007/0258193 | A1 | 11/2007 | Zhong et al. |
| 2007/0259216 | A1 | 11/2007 | Logan |
| 2007/0292746 | A1 | 12/2007 | Sloop |
| 2008/0013224 | A1 | 1/2008 | Kim et al. |
| 2008/0068801 | A1 | 3/2008 | Wilk et al. |
| 2008/0083626 | A1 | 4/2008 | Kubo et al. |
| 2008/0094777 | A1 | 4/2008 | Itahashi et al. |
| 2008/0192407 | A1 | 8/2008 | Lu et al. |
| 2008/0316678 | A1 | 12/2008 | Ehrenberg et al. |
| 2009/0011330 | A1 | 1/2009 | Onodera et al. |
| 2009/0021890 | A1 | 1/2009 | Bourcier et al. |
| 2009/0250409 | A1 | 10/2009 | Fiene et al. |
| 2009/0272935 | A1 | 11/2009 | Hata et al. |
| 2009/0272946 | A1 | 11/2009 | Lu et al. |
| 2009/0303658 | A1 | 12/2009 | Hiroyuki et al. |
| 2010/0046142 | A1 | 2/2010 | Aitchison et al. |
| 2010/0119934 | A1 | 5/2010 | Ushio et al. |
| 2010/0134955 | A1 | 6/2010 | O'Connor et al. |
| 2010/0196600 | A1 | 8/2010 | Shibuya et al. |
| 2011/0080689 | A1 | 4/2011 | Bielawski et al. |
| 2011/0085285 | A1 | 4/2011 | Zednicek et al. |
| 2011/0141661 | A1 | 6/2011 | Muthu et al. |
| 2011/0150736 | A1 | 6/2011 | Hagiwara et al. |
| 2011/0151317 | A1 | 6/2011 | Giroud et al. |
| 2011/0170236 | A1 | 7/2011 | Young |
| 2012/0156528 | A1* | 6/2012 | Cooley ............................... 429/9 |

OTHER PUBLICATIONS

Written Opinion of the International Searching Authority from PCT1US20071068314, mailed Feb. 13, 2008.
International Search Report from PCT/US2012/039342, mailed Dec. 6, 2012.
Written Opinion of the International Searching Authority from PCT/US2012/039342, mailed Dec. 6, 2012.
International Search Report from PCT/US2012/041438, mailed Nov. 19, 2012.
Written Opinion of the International Searching Authority from PCT/US2012/041438, mailed Nov. 19, 2012.
International Search Report from PCT/US2012/045994, mailed Dec. 26, 2012.
Written Opinion of the International Searching Authority from PCT/US2012/045994, mailed Dec. 26, 2012.
International Search Report from PCT/US2012/047474, mailed Oct. 16, 2012.
Written Opinion of the International Searching Authority from PCT/US2012/047474, mailed Oct. 16, 2012.
International Search Report from PCT/US2013/027697, mailed Jun. 26, 2013.
An, et al., "Supercapacitors Using Single-Walled Carbon Nanotube Electrodes", Advanced Materials, Apr. 2001, pp. 497-500, vol. 13, No. 7.
Emmenegger, et al., "Investigation of Electrochemical Double-layer (ECDL) Capacitors Electrodes Based on Carbon Nanotubes and Activated Carbon Materials," J. Of Power Sources, 2003, pp. 321-329, vol. 124.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Hyeok, et al., "Electrochemical Properties of High-Power Supercapacitors Using Single- Walled Carbon Nanotube Electrodes," Adv. Funct. Mater., Oct. 2001, 387-392, vol. 11, No. 5.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Niu, et al., "High Power Electrochemical Capacitors Based on Carbon Nanotube Electrodes," Appl. Phys. Lett., Mar. 17, 1997, pp. 1480-1482, vol. 70, No. 11.
Robertson, "Realistic applications of CNTs," materialstoday, Oct. 2004, pp. 46-52, vol. 7, No. 10.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Carbon Nanotube Enhanced Ultracapacitor", Sep. 2004.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
Office Action dated Dec. 11, 2013, U.S. Appl. No. 12/928,897.
Awad, et al., "Thermal degradation studies of alkyl-imidazolium salts and their application in nanocomposites," Thermochimica Acta, pp. 3-11, 2004, vol. 409.
Balducci, et al., "High temperature carbon—carbon supercapacitor using ionic liquid as electrolyte," J. Power Sources, pp. 922-927, 3 Jan. 2007, vol. 165.

(56) References Cited

OTHER PUBLICATIONS

Liu, et al., "Graphene-Based Supercapacitor with an Ultrahigh Energy Density," Nano Lett., pp. 4863-4868, 2010, vol. 10.

Maxwell Technologies Application Note, "Maxwell Technologies' Test Procedures for Capacitance, ESR, Leakage Current and Self-Discharge Characterizations of Ultracapacitors," Jul. 2009, pp. 1-10.

Ngo, et al., "Thermal properties of imidazolium ionic liquids," Thermochimica Acta, pp. 97-102, 2000, vol. 357-58.

Nishida, et al., "Physical and electrochemical properties of 1-alkyl-3-nriethylirnidazolium tetrafluoroborate for electrolyte," J. Fluorine Chem., pp. 135-141, 2003, vol. 120.

Randstrom, "The influence of air and its components on the cathodic stability of N-butyl-N-methylpyrrolidinium bis (trifluoromethanesulfonyl)imide," Electrochimica Acta, pp. 1837-1842, Aug. 19, 2007, vol. 53.

Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoronnethylsulfonypimide," J. Mol. Liq., pp. 43-50, Aug. 24, 2010, vol. 157.

Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.

\* cited by examiner

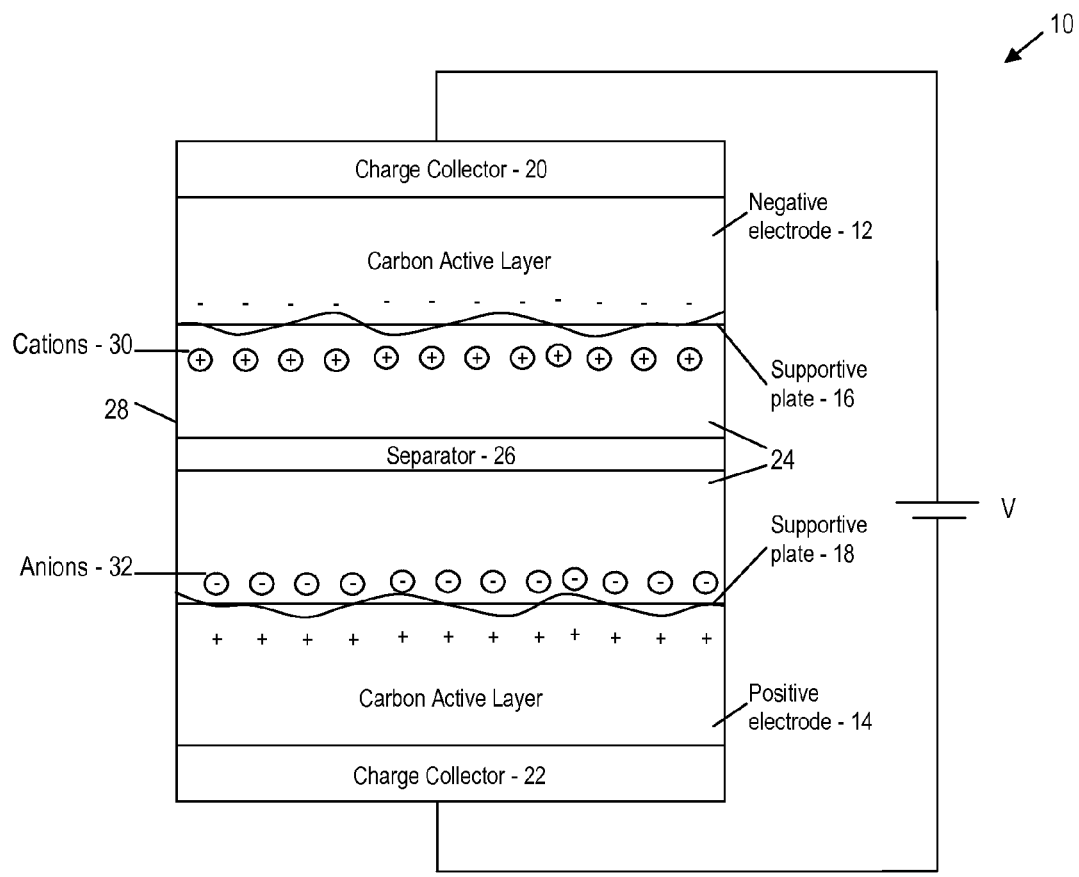

ELECTROCHEMICAL DOUBLE-LAYER CAPACITOR FOR HIGH TEMPERATURE APPLICATIONS

BACKGROUND OF THE INVENTION

The invention generally relates to electrochemical double-layer capacitors, and more specifically to an electrochemical double-layer capacitor for high temperature applications.

An electric double-layer capacitor, also known as a "supercapacitor," "supercondenser," "pseudocapacitor," "electrochemical double layer capacitor (EDLC 10)," or "ultracapacitor," is an electrochemical capacitor that has an unusually high energy density when compared to common capacitors, typically on the order of thousands of times greater than a high capacity electrolytic capacitor.

Industries such as oil-drilling, aerospace, aviation, military and automotive have some applications that require electrical components to work continuously at temperatures typically exceeding 80° C. Capacitors are one of the key components in any electronic device and system; their main functions include power supply voltage smoothing, supporting the energy source, and filtering.

Reliability and safety is a key requirement in typical aerospace and defense applications—where engines, turbo fans, and control and sensing electronics are placed near outer shells of rockets and space shuttles. Automotive applications, such as small gearboxes or embedded alternators/starters, also require reliability and long life at elevated temperatures.

In the oil and gas industries, high temperature capacitors are needed for the Dc/dc converters used in drilling heads that experience rising ambient temperatures the deeper they drill. For example, oil drilling applications typically require capacitors for use in control circuits at 3.3 V (digital) and 5/15 V (analog). The oil industry also has specific service interval requirements.

Automotive applications typically require 12 and 24 V for power lines that, allowing for de-rating, meaning voltages from 25 V and up must be provided. In combination with high temperature, this is a real challenge.

SUMMARY OF THE INVENTION

The present invention discloses an electrical double layer capacitor for high temperature applications.

In general, in one aspect, the invention features an electrochemical double-layer capacitor including two electrodes wetted with an electrolyte, each electrode being attached to or in contact with or coated onto a current collector and separated from each other by a separator porous to the electrolyte, the electrodes, electrolyte and current collector containing less than 1,000 parts per million (ppm) of impurities, while exhibiting a leakage current less than 1 amp per liter of volume over a range of operating temperatures and at a voltage up to a rated voltage.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 1 is a block diagram.

Like reference numbers and designations in the various drawings indicate like elements.

DETAILED DESCRIPTION

This invention discloses an electrochemical double layer capacitor, also referred to as an "ultracapacitor" or "supracapacitor," designed for high temperature applications, such as those applications performing at temperatures exceeding 80° C. Example applications that can utilize the disclosed ultracapacitor herein are oil-drilling, aerospace, aviation, military, automotive and so forth.

As shown in FIG. 1, an exemplary electrochemical double-layer capacitor (EDLC) 10 in accordance with this invention includes two electrodes 12, 14, each with a double layer of charge at an electrolyte interface, supported on conductive metal plates 16, 18. The electrodes 12, 14 are the two electrically conducting parts of the EDLC 10.

The exemplary EDLC 10 includes charge collectors 20, 22, respectively, an electrolyte 24 and a separator 26. In general, the electrolyte 24 is a chemical compound (salt) that disassociates into electrically charged ions. A solvent that that dissolves the ions might be present. The resulting electrolytic solution is an ionic liquid that conducts electricity by ionic transport.

The exemplary EDLC 10 is either a wound or prismatic and then packaged into a cylindrical or prismatic enclosing body. The enclosing body is hermetically sealed. In one example, the package is hermetically sealed by laser, ultrasonic, or welding.

In general, the separator 26 is a thin structural material (usually a sheet) used to separate the electrodes 12, 14, of a divided electrochemical cell into two or more compartments. The electrolyte 24 occupies pores in the electrodes 12, 14 and separator 26.

In the exemplary EDLC 10, the electrodes 12, 14 can be provided by and include activated carbon, carbon fibers, rayon, graphene, aerogel, carbon cloth, and/or carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Others methods may also be used.

Carbon fiber electrodes can be produced, for example, by using paper or cloth preform with high surface area carbon fibers. Other methods may be used.

In one specific example, multiwall carbon nanotubes (MWNT) on a variety of substrates using chemical vapor deposition (CVD) are fabricated for use in the electrodes 12, 14 of EDLC 10. In a preferred embodiment, low-pressure chemical vapor deposition (LPCVD) is used. The fabrication process uses a gas mixture of acetylene, argon, and hydrogen, and an iron catalyst deposited on the substrate using electron beam deposition and or sputtering deposition.

The electrolyte 24 includes a pairing of a cation 30 and an anion 32 and may include a solvent. Various combinations of each are used. In the exemplary EDLC 10, the cation 30 can include 1-(3-Cyanopropyl)-3-methylimidazolium, 1,2-Dimethyl-3-propylimidazolium, 1,3-Bis(3-cyanopropyl)imidazoliu, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof.

In the exemplary EDLC 10, the anion 32 can include bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof.

The solvent can be Acetonitrile, Amides, Benzonitrile, Butyrolactone, Cyclic Ether, Dibutyl carbonate, Diethyl carbonate, Diethylether, Dimethoxyethane, Dimethyl carbonate, Dimethylformamide, Dimethylsulfone, Dioxane, Dioxolane, Ethyl formate, Ethylene carbonate, Ethylmethyl carbonate, Lactone, Linear Ether, Methyl formate, Methyl propionate, Methyltetrahydrofuran, Nitrile, Nitrobenzene, Nitromethane, N-methylpyrrolidone, Propylene carbonate, Sulfolane, Sulfone, Tetrahydrofuran, Tetramethylene sulfone, Thiophene, Ethylene glycol, Diethylene glycol, Triethylene glycol, Polyethylene glycols, Carbonic acid ester, γ-Butyrolactone, Nitrile, Tricyanohexane, or any combination thereof.

The separator 26 can be fabricated from non-woven glass. The separator 26 can also be fabricated from fiberglass, flouro-polymers, Telfon®, PTFE, and ceramics. For example, using non-woven glass, the separator 26 can include main fibers and binder fibers each having a fiber diameter smaller than that of each of the main fibers and allowing the main fibers to be bonded together.

Once the EDLC 10 is fabricated, it may be used in high temperature applications with little or no leakage current. The EDLC 10 described herein can operate efficiently at temperatures from −20 C to 300 C with leakage currents normalized over the volume of the device less than 1 amp per liter (A/L) of volume of the device within the entire operating voltage and temperature range. One key to this performance at −20 C to 300 C with leakage currents less than 1 A/L is the assembly process itself, which produces a finished EDLC 10 having a moisture concentration in the electrolyte of less than 500 parts per million (ppm) over the weight and volume of the electrolyte and an amount of impurities less than 1000 ppm.

More specifically, the activated carbon, carbon fibers, rayon, carbon cloth, and/or nanotubes making up the two electrolytes 12, 14, is dried at elevated temperature in a vacuum environment. The separator 26 is dried at elevated temperature in a vacuum environment. The electrolyte 24 is dried at elevated temperature in a vacuum environment. Once the electrodes 12, 14, the separator 26, and electrolyte 24 are dried under vacuum, they are packaged without a final seal or cap in an atmosphere with less than 50 parts per million (ppm) of water. The uncapped EDLC 10 is dried under vacuum over a temperature range of 100 C to 300 C. Once this final drying is complete, the EDLC 10 is sealed in an atmosphere with less than 50 ppm of moisture.

In addition, impurities, such as halide ions (chloride, bromide, fluoride, iodide), free amines (ammonia), sulfate, metal cations (Ag, Al, Ba, Br, Ca, Cd, Co, Cr, Cu, Fe, K, Li, Mg, Mn, Mo, Na, Ni, Pb, Sr, Ti, Zn), and so forth, are kept to below 1000 ppm. Further, impurities from solvents and precursors used in the synthesis process are kept below 1000 ppm and can include, for example, bromoethane, chloroethane, 1-bromobutane, 1-chlorobutane, 1-methylimidazole, ethyl acetate, methylene chloride and so forth.

Impurities can be measured using a variety of techniques, such as, for example, Atomic Absorption Spectometry (AAS), Inductively Coupled Plasma-Mass Spectometry (ICPMS), or simplified solubilizing and electrochemical electrochemical sensing trace heavy metal oxide particulates based on a task specific ionic liquid.

AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over 70 different elements in solution or directly in solid samples.

ICPMS is a type of mass spectrometry that is highly sensitive and capable of the determination of a range of metals and several non-metals at concentrations below one part in $10^{12}$ (part per trillion). It is based on coupling together an inductively coupled plasma as a method of producing ions (ionization) with a mass spectrometer as a method of separating and detecting the ions. ICP-MS is also capable of monitoring isotopic speciation for the ions of choice.

By reducing the moisture content in the EDLC 10 to less than 500 part per million (ppm) over the weight and volume of the electrolyte and the impurities to less than 1,000 ppm, the EDLC 10 can efficiently operate over a temperature range of −20 C to 300 C with a leakage current less than 1 Amp per Liter within the temperature and voltage range.

It is to be understood that the foregoing description is intended to illustrate and not to limit the scope of the invention, which is defined by the scope of the appended claims. Other embodiments are within the scope of the following claims.

What is claimed is:

1. An electrochemical double-layer capacitor comprising: two electrodes wetted with an electrolyte, each electrode being attached to or in contact with or coated onto a current collector and separated from each other by a separator porous to the electrolyte, the electrodes, electrolyte and current collector containing less than 1,000 parts per million (ppm) of impurities, while exhibiting a leakage current less than 1 amp per liter of volume over a range of operating temperatures and at a voltage up to a rated voltage.

2. The electrochemical double-layer capacitor of claim 1, wherein the two electrodes, the separator and the electrolyte have a low moisture concentration and a low impurity content.

3. The electrochemical double-layer capacitor of claim 2, wherein a moisture concentration of the electrolyte is less than 500 parts per million (ppm) over the weight or volume of the electrolyte and the impurity content is less than 1,000 ppm.

4. The electrochemical double-layer capacitor of claim 2, wherein a moisture concentration adsorbed on the electrode is less than 1,000 ppm over the weight of the electrode and the impurity content is less than 1,000 ppm.

5. The electrochemical double-layer capacitor of claim 2, wherein a moisture concentration adsorbed on the separator is less than 1,000 ppm over the weight of the separator and the impurity content is less than 1,000 ppm.

6. The electrochemical double-layer capacitor of claim 1, wherein each electrode comprises carbon fibers.

7. The electrochemical double-layer capacitor of claim 1, wherein each electrode comprises rayon.

8. The electrochemical double-layer capacitor of claim 1, wherein each electrode comprises activated carbon.

9. The electrochemical double-layer capacitor of claim 1, wherein each electrode comprises aerogel.

10. The electrochemical double-layer capacitor of claim 1, wherein each electrode comprises graphene.

11. The electrochemical double-layer capacitor of claim 1, wherein each electrode comprises carbon cloth.

12. The electrochemical double-layer capacitor of claim 1, wherein each electrode comprises carbon nanotubes.

13. The electrochemical double-layer capacitor of claim 1, wherein each electrode comprises carbon fibers, activated carbon, rayon, aerogel, graphene, carbon cloth, carbon nanotubes, or any combination thereof.

14. The electrochemical double-layer capacitor of claim 1, wherein the separator comprises non-woven glass.

15. The electrochemical double-layer capacitor of claim 1, wherein the separator comprises cellulosic material.

16. The electrochemical double-layer capacitor of claim 1, wherein the separator comprises of polytetrafluoroethylene (PTFE).

17. The electrochemical double-layer capacitor of claim 1, wherein the separator comprises fiberglass.

18. The electrochemical double-layer capacitor of claim 1, wherein the electrolyte comprises a cation and an anion.

19. The electrochemical double-layer capacitor of claim 18, wherein the cation electrolyte is selected from the group consisting of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof.

20. The electrochemical double-layer capacitor of claim 18, wherein the anion electrolyte is selected from the group consisting of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof.

21. The electrochemical double-layer capacitor of claim 1, wherein the electrolyte comprises a cation, an anion and a solvent.

22. The electrochemical double-layer capacitor of claim 21, wherein the cation is selected from the group consisting of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof.

23. The electrochemical double-layer capacitor of claim 21, wherein the anion is selected from the group consisting of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof.

24. The electrochemical double-layer capacitor of claim 21, wherein the solvent is Acetonitrile, Amides, Benzonitrile, Butyrolactone, Cyclic Ether, Dibutyl carbonate, Diethyl carbonate, Diethylether, Dimethoxyethane, Dimethyl carbonate, Dimethylformamide, Dimethylsulfone, Dioxane, Dioxolane, Ethyl formate, Ethylene carbonate, Ethylmethyl carbonate, Lactone, Linear Ether, Methyl formate, Methyl propionate, Methyltetrahydrofuran, Nitrile, Nitrobenzene, Nitromethane, N-methylpyrrolidone, Propylene carbonate, Sulfolane, Sulfone, Tetrahydrofuran, Tetramethylene sulfone Thiophene, Ethylene glycol, Diethylene glycol, Triethylene glycol, Polyethylene glycols, Carbonic acid ester, .gamma.-Butyrolactone, Nitrile, Tricyanohexane, and any combination thereof.

25. The electrochemical double-layer capacitor of claim 21, wherein the impurities include halide ions (chloride, bromide, fluoride, iodide), free amines (ammonia), sulfate, metal cations (Ag, Al, Ba, Br, Ca, Cd, Co, Cr, Cu, Fe, K, Li, Mg, Mn, Mo, Na, Ni, Pb, Sr, Ti, Zn), bromoethane, chloroethane, 1-bromobutane, 1-chlorobutane, 1-methylimidazole, ethyl acetate, methylene chloride, or combinations thereof.

* * * * *